W. J. COX & W. T. SMITH.
Cotton Planters.
No. 141,328.            Patented July 29, 1873.
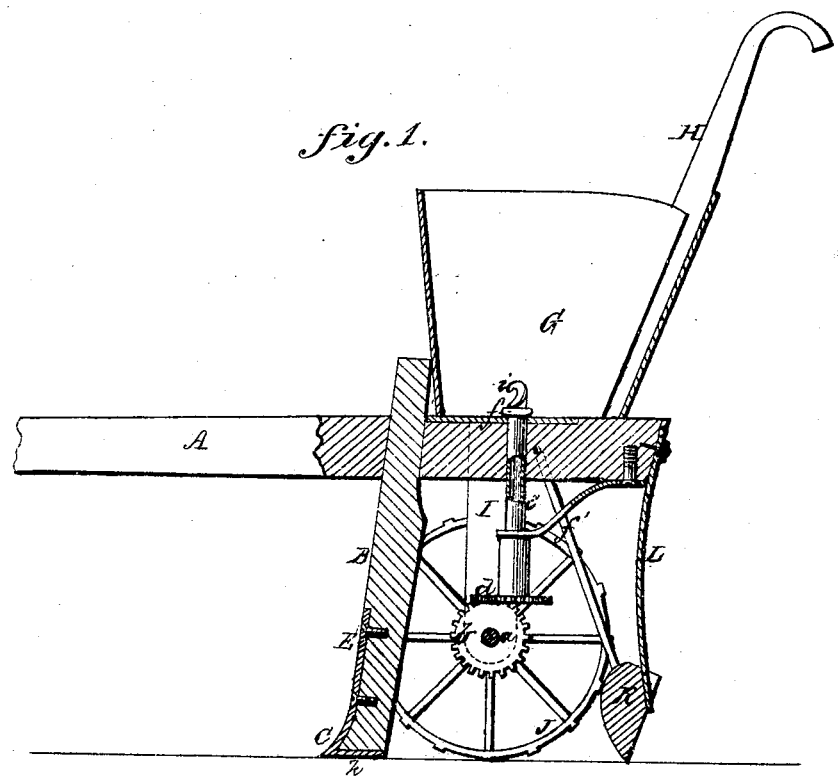
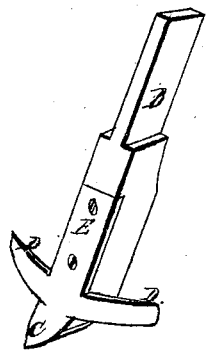

UNITED STATES PATENT OFFICE.

WILLIAM J. COX AND WILLIAM T. SMITH, OF LILESVILLE, NORTH CAROLINA.

IMPROVEMENT IN COTTON-PLANTERS.

Specification forming part of Letters Patent No. 141,328, dated July 29, 1873; application filed June 17, 1873.

*To all whom it may concern:*

Be it known that we, WILLIAM T. SMITH and WILLIAM J. COX, of Lilesville, in the county of Anson and State of North Carolina, have invented certain new and useful Improvements in Cotton-Planters; and we do hereby declare that the following is a full, clear, and exact description thereof, reference being had to the accompanying drawings, and to the letters of reference thereon, which form a part of this specification.

The nature of our invention consists in the construction and arrangement of a cotton-planter, as will be hereinafter more fully set forth.

In order to enable others skilled in the art to which our invention appertains to make and use the same, we will now proceed to describe its construction and operation, referring to the annexed drawing, in which—

Figure 1 is a longitudinal section, and Fig. 2 is a perspective view of the plow-foot.

A represents an ordinary plow-beam, with plow-standard or foot B attached to the same in any suitable manner. The lower end of the foot B is made beveled or rounded on both sides so as to form nearly a sharp edge on the under side. The front at the lower end is also curved forward, as shown, to correspond with the forward curvature of the plow C. This plow is with the upward-extending bar E and wings D D made in one piece and fastened to the foot, being let into the same so that the upper end of the bar E will bear against a shoulder on the foot. The lower edges of the wings D D are bent toward the rear, such inclination increasing gradually from the inner toward the outer ends, as shown. A metal bar, $h$, runs along the edge of the foot B. G represents the seed-box or hopper arranged on top of the beam A in rear of the plow-foot B, and H H are the handles framed in or attached to said box. From each side of the beam, between the foot and handles, a plate or bar, I, extends downward, and in the lower ends of these plates a horizontal shaft, $a$, has its bearings. This shaft runs at right angles with the plow-beam, and has on each end a toothed wheel, J, to run on each side of the furrow and turn the shaft. On this shaft is a cog-wheel, $b$, which gears with a similar wheel, $d$, upon the lower end of a vertical tube, $e$, This tube passes up through the beam A at or about the center of the hopper G, and has a collar, $f$, upon its under end immediately above the plow-beam. The extreme upper end of the tube $e$ is cut out on one side or cut inclined, the highest part of the tube being provided with a projecting lip, $i$.

As the machine is moved forward the wheels J J revolve the shaft $a$, and, through the gear $b\ d$, revolve the shaft $e$, the lip $i$ of which acts as an agitator and catches the seed, so that it will fall down through the hollow tube $e$ into the furrow made by the plow in front.

In rear of the seed-dropping apparatus thus constructed is a coverer, K, hinged to the plow-beam by means of rods $f''\ f'$, and pressed downward and forward by means of a spring, L, attached to the rear end of the plow-beam.

Having thus fully described our invention, what we claim as new, and desire to secure by Letters Patent, is—

The vertical seed-delivering tube $e$, cut as described at the upper end, with a lip, $i$, on one side, and operated by the gears $d\ b$, shaft $a$, and wheels J J, as set forth.

In testimony that we claim the foregoing as our own, we affix our signature in presence of two witnesses.

WM. J. COX.
    WM. T. SMITH.

Witnesses:
 A. A. COX,
 A. L. JACKSON.